United States Patent [19]

Herr

[11] 4,206,658

[45] Jun. 10, 1980

[54] ROTARY RATCHET MECHANISM

[75] Inventor: Robert W. Herr, Fort Wayne, Ind.

[73] Assignee: Bowmar Instrument Corporation, Fort Wayne, Ind.

[21] Appl. No.: 929,190

[22] Filed: Jul. 28, 1978

[51] Int. Cl.2 .......................... G01L 5/28; E21B 49/00

[52] U.S. Cl. .......................................... 74/128; 74/152; 74/160

[58] Field of Search ................. 74/128, 129, 152, 155, 74/160, 161

[56] References Cited

U.S. PATENT DOCUMENTS

| | | | |
|---|---|---|---|
| 2,576,131 | 11/1951 | Lyon | 74/128 X |
| 2,618,982 | 11/1952 | Mead | 74/128 |
| 3,101,013 | 8/1963 | Ayers et al. | 74/160 X |
| 3,255,857 | 6/1966 | Armstrong et al. | 74/160 X |
| 3,501,968 | 3/1970 | Fredell | 74/128 |

FOREIGN PATENT DOCUMENTS

| | | | |
|---|---|---|---|
| 401423 | 11/1933 | United Kingdom | 74/128 |
| 526739 | 10/1976 | U.S.S.R. | 74/128 |

*Primary Examiner*—Wm. Carter Reynolds

*Attorney, Agent, or Firm*—Gust, Irish, Jeffers & Hoffman

[57] ABSTRACT

Rotary ratchet mechanism includes a ratchet wheel rotating about a first axis. A dog at one end of a lever engages a tooth of a wheel to rotate it in one direction. The lever is pivoted to a member at a point spaced from its end, the member being movable from first to second positions along a second axis spaced from the first axis and normal to a plane including the same to move the dog in the opposite direction from a first position engaging one tooth to a second position engaging another tooth. The pivot is spaced from the second axis on its side remote from the first axis and in the first position of the member is spaced from the other side of the plane. An anti-reversing dog is provided at one end of a second layer pivoted to a support at a second point spaced from its end, the second pivot being spaced from the other side of the plane and from the second axis on its side toward the first axis. Spring means acts on both levers to bias the first lever to urge the dog into engagement with a tooth, to bias the second lever in a direction to urge the anti-reverse dog into engagement with a driving portion of a tooth, and to return the member to its first position thereby to return the first lever and dog to the first position to rotate the wheel in one direction.

10 Claims, 2 Drawing Figures

ROTARY RATCHET MECHANISM

BACKGROUND OF THE INVENTION

1. Field of the Invention

This invention relates generally to rotary ratchet mechanisms, and more particularly to a rotary ratchet mechanism which employs only a single spring for biasing driving and anti-reverse dogs toward engagement with the teeth of the wheel and returning the driving dog to a normal position.

2. Description of the Prior Art

Rotary ratchet mechanisms which provide one predetermined incremental rotation of shaft in response to each linear movement of an actuating member are well-known in the art. Prior rotary ratchet mechanisms known to the present applicant have included at least two springs for respectively biasing driving and anti-reversing dogs into engagement with respective teeth of the ratchet wheel. In one specific form of rotary ratchet mechanism known to the present applicant, a coil spring returns the actuating member and driving dog to a normal position and two leaf springs, or the opposite ends of a center-mounted leaf spring, respectively urge the driving and anti-reversing dogs into engagement with respective teeth of the wheel; however, leaf springs are subject to breakage due to fatigue and if one of the two leaf springs breaks, malfunctioning of the mechanism results.

It is accordingly desirable to provide a rotary ratchet mechanism which eliminates the leaf springs employed in prior mechanisms and utilizes only a single spring to perform all of the required biasing functions.

SUMMARY OF THE INVENTION

The invention, in its broader aspects, provides a rotary ratchet mechanism including a toothed ratchet wheel mounted on a support member for rotation about a first axis, each tooth of the wheel having a driving portion and an inclined portion. A driving dog is provided at one end of a lever member adapted to engage a driving portion of a tooth thereby to rotate the wheel in one direction, the lever member being pivotally connected to a pivot member at a point spaced from the one end. The pivot member is linearly movable from a first position to a second position along a second axis spaced from the first axis and normal to a plane including the first axis thereby to move the driving dog in a direction opposite the one direction from a first position with the driving dog engaging the driving portion of one tooth to a second position engaging the driving portion of another tooth. The pivot point of the lever member is spaced from the second axis on the side thereof remote from the first axis and in the first position of the pivot member is spaced from one side of the plane. An anti-reverse dog is provided at one end of a second lever member pivotally connected to the support member at a second point spaced from the one end thereof, the second pivot point being spaced from the other side of the plane and also spaced from the second axis on the side thereof toward the first axis. Spring means is provided acting on both lever members thereby to bias the first lever member in a direction to urge the driving dog into engagement with a driving portion of a tooth, to bias the second lever member in a direction to urge the anti-reverse dog into engagement with a driving portion of a tooth, and to return the pivot member to its first position thereby to return the first lever member and driving dog from the second position to the first position so as to rotate the wheel in the one direction by a predetermined incremental amount.

It is accordingly an object of the invention to provide an improved rotary ratchet mechanism.

A further object of the invention is to provide an improved rotary ratchet mechanism employing only a single spring.

A still further object of the invention is to provide an improved rotary ratchet mechanism wherein leaf springs employed in prior mechanisms are eliminated.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
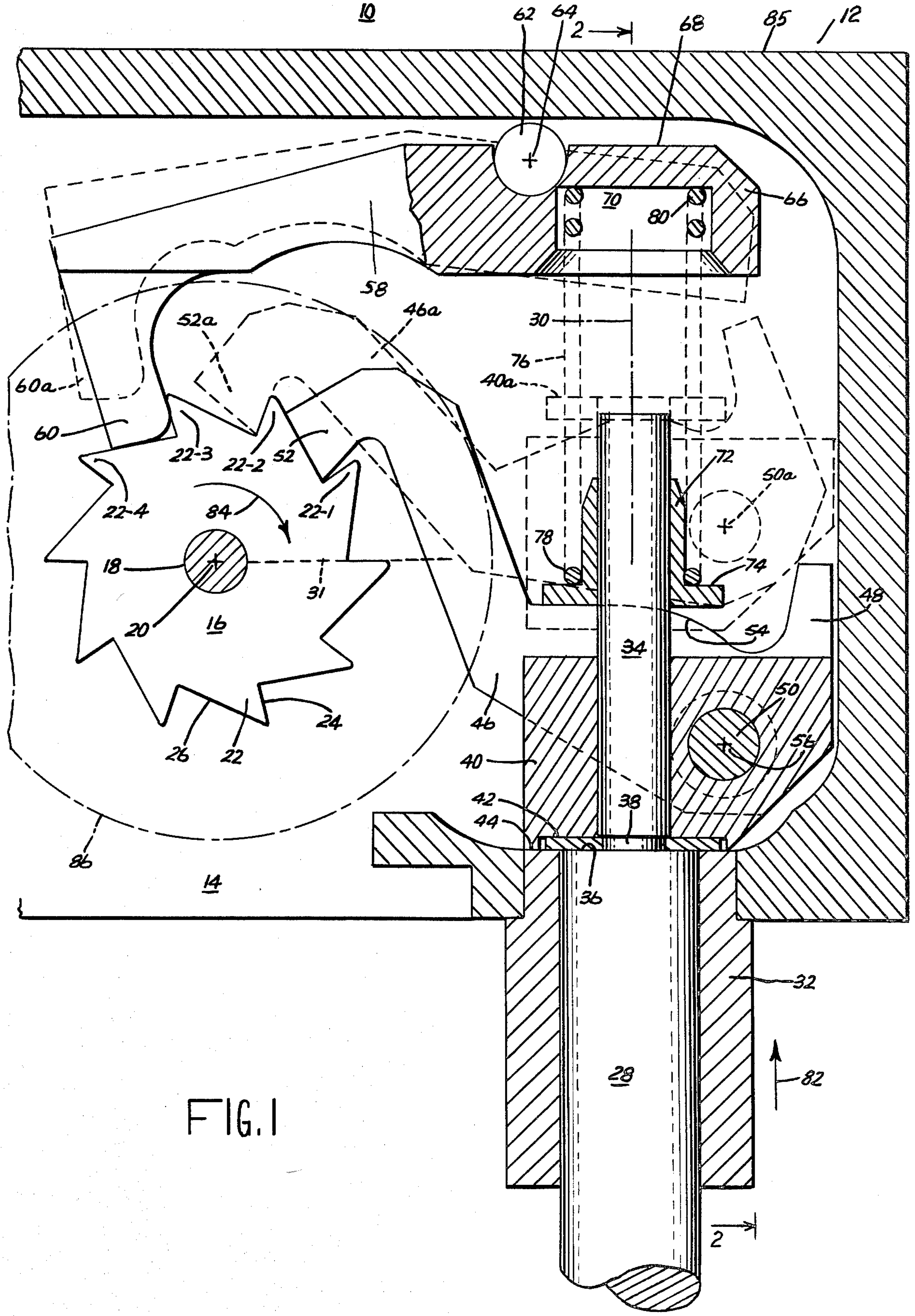
FIG. 1 is a side view, partly in cross-section, showing the improved rotary ratchet mechanism of the invention.
Figure 2:
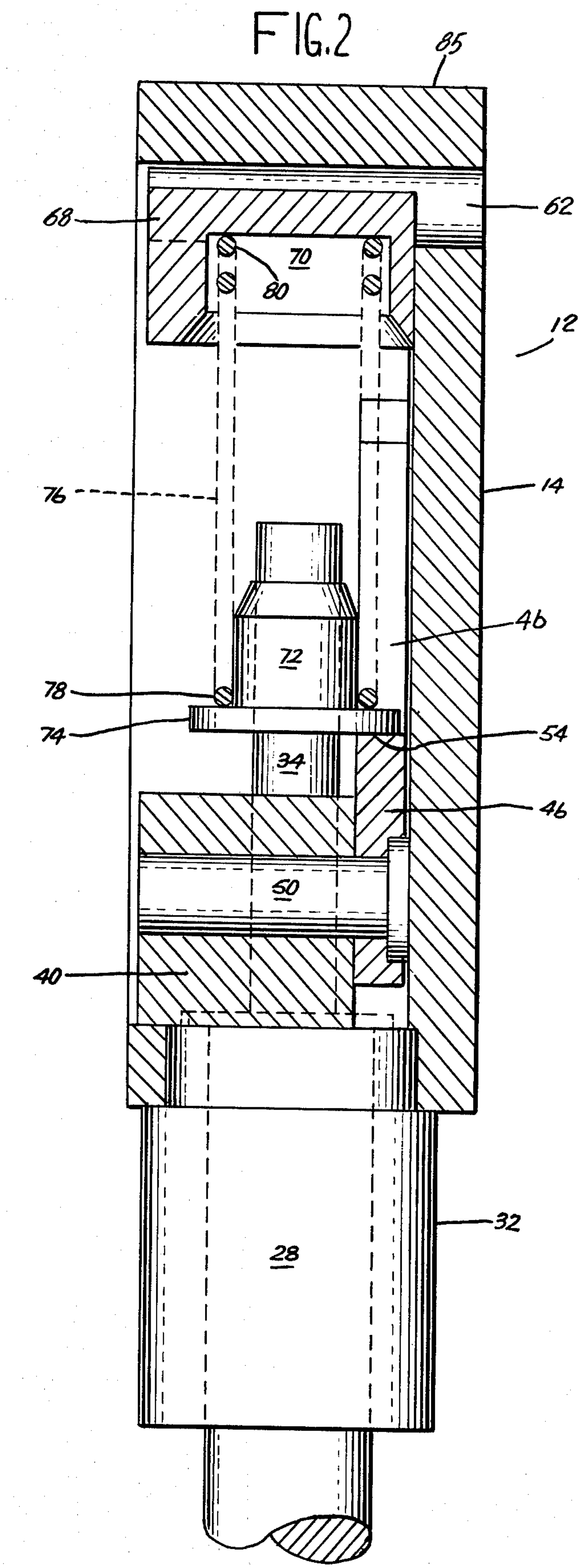
FIG. 2 is a cross-sectional view taken generally along the line 2—2 of FIG. 1.

Referring now to the drawings, the improved rotary ratchet mechanism of the invention, generally indicated at 10, includes housing member 12 having side wall 14. Ratchet wheel 16 on shaft 18 is rotatably mounted on side wall 14 for rotation about first axis 20. Ratchet wheel 16 has teeth 22 each having driving portion 24 and inclined portion 26.

Actuating plunger 28 is provided disposed on second axis 30 perpendicular to imaginary plane 31 including axis 20 and spaced therefrom. Plunger 28 is guided for linear movement in bushing 32 mounted on support member 12. Actuating member 28 has elongated portion 34 joined thereto by shoulder 36. Annular slot 38 is formed in portion 34 adjacent shoulder 36.

Collar or pivot member 40 is slidably mounted on portion 34 of actuating member 28. Actuating member 28 is prevented from falling out of bushing 32 and collar 40 by conventional E-ring 42 seated in groove 38 and engaging upper end 44 of bushing 32 in the position shown in solid lines in FIG. 1.

Lever member 46 has one end 48 pivotally connected, as by pin 50, to collar 40 on the side of elongated portion 34 of plunger 28 remote from axis 20 of ratchet wheel 16. Lever member 46 is laterally off-set with respect to portion 34 of plunger 28 and has driving dog 52 at its other end which, in a first or normal posiion of actuating plunger 28 and collar 40, engages tooth 22-1 of ratchet wheel 16. Cam surface 54 is formed on the upper side of lever member 46. It will be observed that pivot axis 56 of lever member 46 is spaced on the side of axis 30 of plunger 28 remote from axis 20 of ratchet wheel 16. In the normal position of collar 40 and lever member 46, pivot axis 56 is spaced on one side of plane 31.

Another lever member 58 is provided having anti-reverse dog 60 adapted normally to engage the driving portion of another tooth 22-3 of ratchet wheel 16. Lever member 58 is pivotally connected to support member 12 by pivot pin 62, pivot axis 64 of lever member 58 being spaced above plane 31, intermediate axes 20 and 30, and intermediate end 66 of lever member 58 and dog 60. It will be seen that axis 30 of plunger 28 extends through portion 68 of lever member 58 intermediate end 66 and pivot axis 64. Recess 70 is formed in portion 68 of lever member 58 generally coaxial with axis 30.

Spring seat member 72 having annular flange 74 thereon is slidably mounted on portion 34 of plunger 28. Coil spring 76 is provided coaxial with axis 30 having one end 78 seated on flange 74 of spring seat 72, and its other end 80 seated in recess 70. Flange 74 of spring seat member 72 is in engagement with cam surface 54 of lever member 46.

It will now be seen that upon linear movement of actuating member 28 in the direction shown by arrow 82, shoulder 36 and E-ring 42 move collar 40 and lever member 46 upwardly against the force exerted by spring 76 to the position shown in dashed lines at 40*a*, 46*a*, thereby causing driving dog 52 to slide upwardly on inclined surface 26 of tooth 22-2 until it drops into engagement with driving surface 24 of tooth 22-2, as shown in dashed lines at 52*a*. At the same time, spring 76, being seated in cavity 70 in portion 68 of lever member 58, biases that lever member in a counterclockwise direction to force anti-reverse dog 60 firmly into engagement with driving surface 24 of tooth 22-3 thereby preventing rotation of ratchet wheel 16 in the direction opposite that shown by arrow 84. When spring 76 causes actuating plunger 28 to return to its normal position as shown in solid lines in FIG. 1, driving dog 52 at the end of lever member 46 advances ratchet wheel 16 in the direction shown by arrow 84 by an incremental amount corresponding to the pitch of one tooth 22, relaxation of the force exerted by coil spring 76 on lever member 58 permitting anti-reversing dog 60 to be moved by the inclined surface 26 of tooth 22-4 to the position shown in dashed lines at 60*a*. It will be seen that in the actuated position of lever member 46, as shown in dashed lines at 46*a*, pivot point 50*a* is above plane 31 and that in this embodiment, incremental advance of ratchet wheel 16 in the direction shown by arrow 84 is responsive to the return stroke of actuating plunger 28 in the direction opposite that shown by arrow 82 under the influence of spring 76.

The geometry of the location of pivot axis 64 of anti-reversing dog 60 is important; with pivot axis 64 spaced above plane 31, as shown in FIG. 1, anti-reverse dog 60 will slide over inclined surface 26 of a tooth and into a position to engage the next driving surface 24 before plunger 28 has completed its return stroke in the direction opposite arrow 82 and before driving dog 52 has completed its movement from its position shown in dashed lines 52*a* to its position shown in solid lines at 52 in FIG. 1, so that the next depression of plunger 28 will not cause oscillation of ratchet wheel 16, a necessary requirement in order to prevent loss of count. It will also be observed that housing member 12 includes top wall 85 extending outwardly from side wall 14 and parallel with plane 31, end 68 of lever member 58 being closely spaced from wall 85 when anti-reverse dog 60 is in engagement with a driving portion 24 of a tooth 22.

A device driven by shaft 18 of ratchet wheel 16, such as a number wheel of a mechanical revolution counter, is shown in dashed lines at 86 in FIG. 1.

It will now be seen that the improved rotary ratchet mechanism of the invention utilizes only a single coil spring 76 for performing all of the required biasing and actuating plunger return functions, thus eliminating additional springs and, in particular, the leaf springs of prior rotary ratchet mechanisms which are subject to breakage.

While there have been described above the principles of this invention in connection with specific apparatus, it is to be clearly understood that this description is made only by way of example and not as a limitation to the scope of the invention.

What is claimed is:

1. In a rotary ratchet mechanism including a toothed ratchet wheel mounted on a support member for rotation about a first axis, each tooth of said wheel having a driving portion and an inclined portion, a driving dog at one end of a lever member and adapted to engage a driving portion of a said tooth thereby to rotate said wheel in one direction, said lever member being pivotally connected to a pivot member at a point spaced from said one end, said pivot member being linearly movable from a first position to a second position along a second axis spaced from said first axis and normal to a plane including said first axis thereby to move said driving dog in a direction opposite said one direction from a first position with said driving dog engaging the driving portion of one tooth to a second position engaging the driving portion of another tooth, spring means for returning said pivot member to said first position thereof thereby to return said lever member and driving dog from said second positions to said first positions to rotate said wheel in said one direction by a predetermined incremental amount, and an anti-reversing dog adapted to engage the driving portion of one tooth thereby to prevent rotation of said wheel in the opposite direction; the improvement wherein said pivot point in said first position of said pivot member is spaced from said second axis on the side thereof remote from said first axis, said anti-reversing dog being at one end of a second lever member pivotally connected to said support member at a second point spaced from said one end thereof, said second pivot point being spaced from the other side of said plane and spaced from said second axis on the side thereof toward said first axis, said spring means comprising a single spring acting on said pivot member and both said lever members thereby to bias said driving dog into engagement with a driving portion of a said tooth and to bias said second lever member in a direction to urge said anti-reversing dog into engagement with a driving portion of a said tooth.

2. The ratchet mechanism of claim 1 wherein said second lever member has a second end with said second pivot point spaced therefrom toward said one end thereof, said spring means acting on said first-named lever member intermediate said first-named pivot point and said driving dog, and acting on said second lever member intermediate said second pivot point and said second end thereof.

3. The ratchet mechanism of claim 2 wherein said spring means is a coil spring.

4. The ratchet mechanism of claim 3 wherein said spring is generally concentric with said second axis.

5. The ratchet mechanism of claim 3 further comprising an elongated actuating member on said second axis and having a shoulder defining an extension portion, said pivot member comprising a collar on said extension portion and seated against said shoulder, and means on said support member for guiding said actuating member for linear movement on said second axis.

6. The ratchet mechanism of claim 5 wherein said coil spring has opposite ends, said second lever member having a recess formed therein on said second axis, one end of said coil spring being seated in said recess, and further comprising a spring seat member on said extension portion of said actuating member and engaging said first lever member intermediate said one end thereof and said first-named pivot point, the other end of said coil spring being seated on said spring seat member.

7. The ratchet mechanism of claim 6 wherein said second lever member is proportioned so that said anti-reverse dog moves out of engagement with the driving portion of one tooth and into position to engage the driving portion of an adjacent tooth before said driving dog completes a movement from said second to said first position thereof.

8. The ratchet mechanism of claim 7 wherein said support member includes a wall spaced from and generally parallel with said other side of said plane, said second end of said second lever member being closely spaced from said wall when said anti-reverse dog is in engagement with a driving portion of a said tooth, said support member having a pivot portion thereon for said second lever member.

9. The ratchet mechanism of claim 7 wherein said collar is axially movable on said extension portion, said first-named lever member being laterallly off-set from said extension portion and having a cam portion extending above said collar and engaging said spring seat member.

10. The ratchet mechanism of claim 9 wherein said first-named pivot point in said second position of said pivot member is spaced from said other side of said plane.

* * * * *